United States Patent
Luo et al.

(10) Patent No.: US 7,092,573 B2
(45) Date of Patent: Aug. 15, 2006

(54) METHOD AND SYSTEM FOR SELECTIVELY APPLYING ENHANCEMENT TO AN IMAGE

(75) Inventors: Jiebo Luo, Pittsford, NY (US); Andrew C. Gallagher, Brockport, NY (US); Amit Singhal, Scottsville, NY (US); Robert T. Gray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 580 days.

(21) Appl. No.: 10/016,601

(22) Filed: Dec. 10, 2001

(65) Prior Publication Data

US 2003/0108250 A1 Jun. 12, 2003

(51) Int. Cl.
*G06K 9/62* (2006.01)

(52) U.S. Cl. ...................... 382/228; 382/254
(58) Field of Classification Search ................ 382/300, 382/205, 254, 228
See application file for complete search history.

(56) References Cited

U.S. PATENT DOCUMENTS

| | | | |
|---|---|---|---|
| 4,203,671 A | 5/1980 | Takahashi et al. | |
| 4,682,230 A | 7/1987 | Perlman et al. | |
| 5,523,849 A * | 6/1996 | Jamzadeh | 358/1.9 |
| 5,682,443 A | 10/1997 | Gouch et al. | |
| 5,710,833 A | 1/1998 | Moghaddam et al. | |
| 5,781,276 A | 7/1998 | Zahn et al. | |
| 5,848,181 A * | 12/1998 | Ogata | 382/169 |
| 5,889,578 A * | 3/1999 | Jamzadeh | 355/41 |
| 5,901,245 A | 5/1999 | Warnick et al. | |
| 6,141,017 A * | 10/2000 | Cubillo et al. | 345/660 |
| 6,453,069 B1 * | 9/2002 | Matsugu et al. | 382/173 |
| 6,504,951 B1 * | 1/2003 | Luo et al. | 382/165 |
| 6,636,645 B1 * | 10/2003 | Yu et al. | 382/268 |
| 6,665,446 B1 * | 12/2003 | Kato | 382/251 |
| 6,707,940 B1 * | 3/2004 | Qian | 382/173 |
| 6,731,821 B1 * | 5/2004 | Maurer et al. | 382/263 |
| 6,738,494 B1 * | 5/2004 | Savakis et al. | 382/100 |
| 6,845,181 B1 * | 1/2005 | Dupin et al. | 382/274 |
| 6,891,977 B1 * | 5/2005 | Gallagher | 382/263 |
| 2001/0031804 A1 | 10/2001 | Cannata et al. | |
| 2002/0076100 A1 * | 6/2002 | Luo | 382/164 |
| 2002/0093670 A1 * | 7/2002 | Luo et al. | 358/1.9 |
| 2003/0093279 A1 * | 5/2003 | Malah et al. | 704/265 |
| 2003/0108245 A1 * | 6/2003 | Gallagher et al. | 382/228 |

FOREIGN PATENT DOCUMENTS

EP 0 681 268 A1 11/1995

(Continued)

OTHER PUBLICATIONS

Cho et al., Adaptive skin-color filter, Pattern Recognition 34 (2001) pp. 1067-1083.

(Continued)

*Primary Examiner*—Matthew C. Bella
*Assistant Examiner*—Dennis Rosario
(74) *Attorney, Agent, or Firm*—Thomas H. Close (57) ABSTRACT

A method for processing a digital color image includes the steps of: providing a subject matter detector for distinguishing between target and background subject matters; applying the subject matter detector to the image to produce a belief map indicating the degree of belief that pixels in the image belong to target subject matter; providing an image enhancement operation that is responsive to a control signal for controlling the degree of image enhancement; and applying image enhancement to the digital image by varying the control signal according to the belief map to produce an enhanced image.

33 Claims, 5 Drawing Sheets

FOREIGN PATENT DOCUMENTS

EP  1 017 019 A2  7/2000

OTHER PUBLICATIONS

Fleck et al., Finding Naked People, *Proceedings of the European Conference on Computer Vision*, vol. 2, 1996, pp. 592-602.

Heisele et al., Face Detection in Still Gray Images, *MIT Artificial Intelligence Lab*, A.I. Memo No. 1687, C.B.C.L Paper No. 187, May 2000, pp. 1-126.

Saber et al., Automatic Image Annotation Using Adaptive Color Classification, *Graphical Models and Image Processing*, vol. 58, No. 2, Mar. 1996, pp. 115-126.

Lee, Digital Image Smoothing and the Sigma Filter, *Computer Vision, Graphics, and Image Processing*, vol. 24, Apr. 1983, pp. 255-269.

Luo et al., Artifact Reduction in Low Bit Rate DCT-Based Image Compression, *IEEE Transactions on Image Processing*, vol. 5, No. 9, Sep. 1996, pp. 1363-1368.

U.S. 09/450,190, filed Nov. 29, 1999 by Luo et al.

U.S. Appl. No. 09/904,366, filed Jul. 12, 2001 by Dupin et al.

U.S. Appl. No. 09/951,256, filed Sep. 13, 2001 by Luo et al.

Singhal et al., A Multilevel Bayesian Network Approach to Image Sensor Fusion, *Proceedings of the Third International Conference on Information Fusion*, Paris, France, Jul. 2000, pp. 9-16.

Anil K. Jain; Fundamentals of Digital Image Processing; 1989 Prentice Hall, Englewood Cliff, NJ 07632; pp. 249-250.

\* cited by examiner

METHOD AND SYSTEM FOR SELECTIVELY APPLYING ENHANCEMENT TO AN IMAGE

FIELD OF THE INVENTION

The invention relates generally to the field of digital image processing and, more particularly, to a method for determining the amount of enhancement applied to an image based on subject matter in the image.

BACKGROUND OF THE INVENTION

In general, image enhancement involves applying one or more operations to an image to improve the image quality, for example, sharpening improves image details, noise reduction removes image noise, de-blocking removes blocking artifacts caused, for example, by JPEG image compression, scene balance adjustment improves brightness and color balance, and tone-scale adjustment improves image contrast and rendering.

While these methods do indeed produce enhanced images, the quality of the resulting image often varies depending on the image content. For example, using the unsharp mask algorithm may produce a pleasing result for an image of a building. However, using the same algorithm may result in the undesirable appearance of oversharpening for an image of a human face (e.g., wrinkles, blemishes may be unpleasantly "enhanced", i.e., made more visible). For another example, using a smoothing algorithm helps remove the amount of noise and/or blocking artifacts and produce a pleasing result for an image of a human face or clear blue sky. However, the same operation of the same amount may result in undesirable removal of details in grass lawn, textured fabric, or animal hair. Conventionally, the amount of sharpening, or any other type of enhancement, needs to be adjusted individually for each scene by a human operator, an expensive process. Another drawback of the conventional approach is that the amount of sharpening cannot be adjusted easily on a region by region basis within the same image, resulting in having to apply an amount of enhancement that is a trade-off between different amounts required by different subject matters or objects in the scene.

In the prior art, there are examples of modifying an image enhancement operation based on pixel color. For example, in U.S. Pat. No. 5,682,443 issued Oct. 28, 1997, Gouch et al. describe a method of modifying, on a pixel by pixel basis, the parameters associated with the unsharp mask. Sharpening an image with unsharp masking can be described with the following equation:

$$s(x,y)=i(x,y)b(x,y)+\beta f(i(x,y)-i(x,y)b(x,y)) \quad (1)$$

where:
- $s(x,y)$=output image with enhanced sharpness
- $i(x,y)$=original input image
- $b(x,y)$=lowpass filter
- $\beta$=unsharp mask scale factor
- $f()$=fringe function
- ** denotes two dimensional convolution
- $(x,y)$ denotes the x-th row and the y-th column of an image Typically, an unsharp image is generated by convolution of the image with a lowpass filter (i.e., the unsharp image is given by $i(x,y)b(x,y)$). Next, the highpass, or fringe data is generated by subtracting the unsharp image from the original image (the highpass data is given by $i(x,y)-i(x,y)b(x,y)$). This highpass data is then modified by either a scale factor $\beta$ or a fringe function $f()$ or both. Finally, the modified highpass data is summed with either the original image or the unsharp image to produce a sharpened image.

Gouch et al. teach that the fringe function may be dependent on the color of the pixel $i(x,y)$ This feature allows them to tailor the sharpening preformed for those pixels which are similar in color to flesh, for example. However, this method is not based on a probability or degree of belief that specific image pixels represent human flesh, and thus likely unnecessarily conservatively sharpens image regions having a similar color to human flesh such as bricks or wood. The method of Gouch et al. exclusively uses image color and does not allow for the use of other features such as texture or shape features which research has shown to effectively classify image regions.

Schwartz discloses the concept of automatic image correction using pattern recognition techniques in Europe Patent Application 0681268, filed Apr. 10, 1995, wherein the pattern recognition sub-system detects the presence and location of color-significant objects. Another similar method of selective enhancement of image data was described by Cannata, et al. in U.S. Ser. No. 09/728,365, filed Nov. 30, 2000, published Oct. 18, 2001. In one embodiment, spatial processing transformations such as sharpening are reduced or bypassed for pixels having color code values within a range known to be adversely affected by the spatial processing transformations. In another embodiment, color correction processing transformations are bypassed for pixels having color code values with a neutral color range. Clearly, since color is the only characteristic used to perform selective enhancement, undesirable effects can be obtained for other subject matters with similar colors.

Therefore, there exists a need for determining the types and amounts of enhancement for a particular image, whereby the local quality (e.g., sharpness and color) of the image can be improved depending on detecting different objects or subject matters contained within the image.

SUMMARY OF THE INVENTION

The need is met according to the present invention, by providing a method for processing a digital color image that includes providing a subject matter detector for distinguishing between target and background subject matters; applying the subject matter detector to the image to produce a belief map indicating the degree of belief that pixels in the image belong to target subject matter; providing an image enhancement operation that is responsive to a control signal for controlling the degree of image enhancement; and applying image enhancement to the digital image by varying the control signal according to the belief map to produce an enhanced image.

ADVANTAGES

The present invention has the advantage that the local amount of image enhancement operation of an image can be varied depending on the detected subject matter within the image. Rather than tuning a system to apply image enhancement to all images or an entire given image at a conservative level, for fear of creating enhancement artifacts in some images or some image areas of a given image, the present invention automatically determines the amount of image enhancement for each region in an image based on the subject matter content of the region. Moreover, for certain regions of an image, the enhancement operation may not be performed at all (i.e., the amount of enhancement is zero) based on the strong belief that a particular target subject matter exists in the region.

DETAILED DESCRIPTION OF THE INVENTION

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown or described herein may be selected from such subject matters, components, and elements known in the art. Given the description as set forth in the following specification, all software implementation thereof is conventional and within the ordinary skill in such arts.

Figure 1:
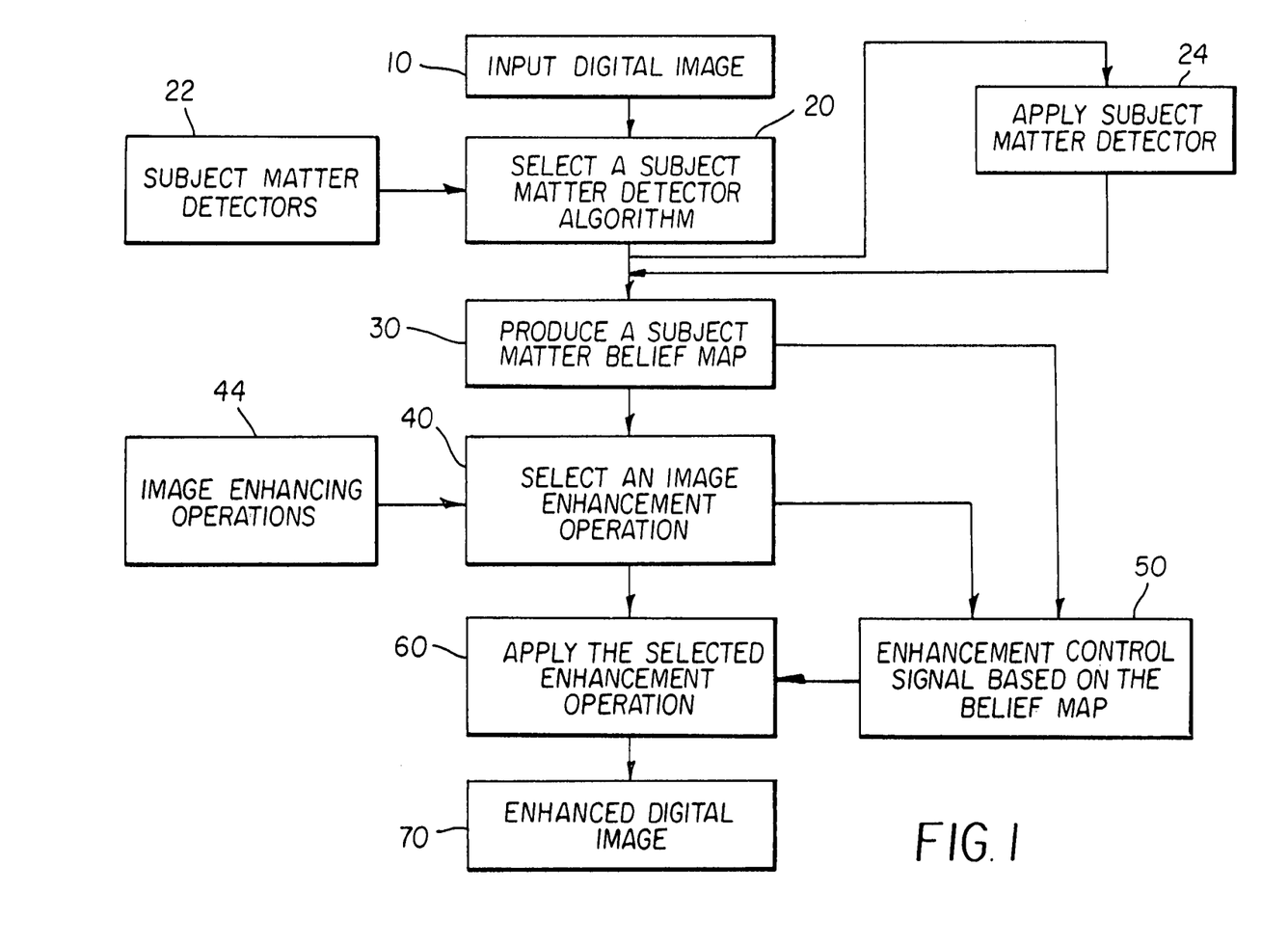
FIG. 1 is a flowchart illustrating the present invention.

FIG. 1 illustrates the preferred embodiment of the present invention for processing an image with a specific image processing path in order to obtain an enhanced output image. In general, the present invention performs an enhancement operation to an image, the amount of enhancement being determined by the subject matter(s) or objects within the image. Thus, the amount of enhancement applied to individual images, or individual regions within a particular image, may vary depending on the image content. The amount of enhancement applied to any particular image or any particular region in an image is selected to be appropriate for the specific image content.

In a preferred embodiment of the present invention, an image $i(x,y)$ having $x_o$ rows and $y_o$ columns is first reduced to a low resolution version in order to decrease the processing time required by the present invention to detect interesting subject matters and the corresponding control signal for image enhancement. Preferably the image $i(x,y)$ is of high resolution, for example $x_o=1024$ rows of pixels by $y_o=1536$ columns of pixels. The low resolution image has $m_o$ rows and $n_o$ columns, preferably $m_o=256$ and $n_o=384$ pixels. Many methods of creating small image from larger images are known in the art of image processing and can be used (see textbook: Gonzalez et al., Digital Image Processing, Addison-Wesley, 1992). Alternatively, this step may be omitted.

Referring to FIG. 1, there is shown a block diagram of the present invention. A digital color image 10 is obtained. Next, a subject matter detector is selected 20 from a collection of subject matter detectors 22 and then applied 24 to the digital image. The result is a subject matter belief map 30, indicating the belief that particular pixels or regions of pixels belong to a given target subject matter. The target subject matter is a subject matter to which a particular image enhancement operation is sensitive. Alternatively, a collection of target subject matters can be pre-determined. The subject matter detector selected in step 20 outputs a subject matter belief map 30 $M(m,n)$, preferably having the same pixel dimensions in terms of rows and columns as the image input to the subject matter detector. If the input digital image is reduced in size and leads to a belief map that does not match the size of the original input image, the belief map can be interpolated accordingly. The belief map indicates the belief that particular pixels represent the target subject matter. The belief is preferably represented as a probability. For example, each pixel value $M(m,n)$ is equal to 100*P( pixel $(m,n)$ of the low resolution image represents the target subject matter), where $P(A)$ represents the probability of event A. Alternatively, each pixel value $M(m,n)$ may represent a binary classification indicating belief (after the belief values are thresholded by a pre-determined value). For instance, a pixel value of 1 in the belief map may represent belief that the pixel represents the target subject matter with the highest probability and a pixel value of 0 may represent the belief that the pixel does not represent the target subject matter with the highest probability. In another alternative, the belief may be represented by a distance, for example a distance in a feature space where generally higher distances correspond to lower belief values and lower distances correspond to higher belief values.

In the preferred embodiment, one of the target subject matters is human flesh. U.S. Ser. No. 09/904,366 filed Jul. 21, 2001 Dupin et al. describes a method of creating a belief map indicating the belief for a target subject matter of flesh.

Figure 9:
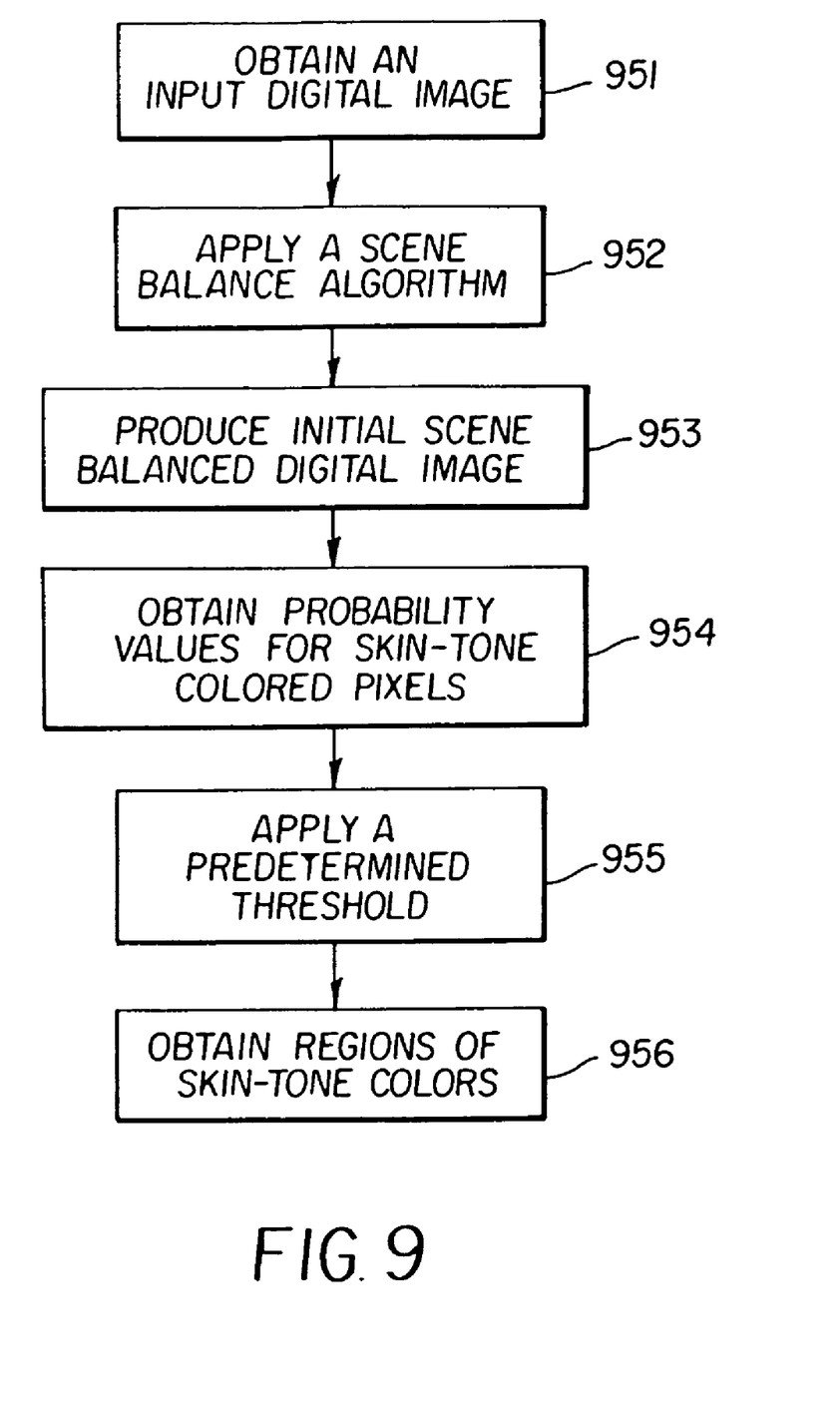
FIG. 9 is a block diagram showing the method for detecting skin-tone regions.

Referring to FIG. 9, one method that can be used with the present invention for implementing a subject matter detector 22 is illustrated. First, an input digital image is obtained using an obtain input digital image step 951. This input digital image is then processed using an apply scene balance algorithm step 952 to obtain an estimate of the appropriate color balance of the image using a conventional scene balance algorithm. Next, a produce initial scene balanced digital image step 953 is used to apply any necessary corrections to the input digital image. The scene-balanced digital image is then processed by an obtain probability values for skin-tone colored pixels step 954. An apply predetermined threshold step 955 is then applied to the probability values, followed by an obtain regions of skin tone colors step 956.

One method that can be used for the obtain regions of skin-tone colored pixels step 954 is more completely described in the following. The pixel RGB values are converted to "Lst" coordinates by the following equations:

$$L=(R+G+B)/\text{sqrt}(3)$$

$$s=(R-B)/\text{sqrt}(2)$$

$$t=(2G-R-B)/\text{sqrt}(6)$$

For each pixel in the input color digital image, the probability that it is a skin-tone pixel is computed. The probability is derived from its coordinates in the Lst space, based on predetermined skin-tone probability functions. These probability functions were constructed based on collection of data for the color-space distributions of skin and non-skin regions in a large collection of scene balanced images. The conditional probability that a pixel is a skin-tone pixel given its Lst coordinates is:

$$Pr(\text{Skin}|L,s,t)=Pr(\text{Skin}|L)*Pr(\text{Skin}|s)*Pr(\text{Skin}|t)$$

where each of the conditional distributions Pr(Skin|L), Pr(Skin|s), and Pr(Skin|t) are constructed by application of Bayes Theorem to the original training distributions for skin and non-skin pixels. In comparison, other conventional methods for detecting skin-tone colored pixels (see U.S. Pat. No. 4,203,671 issued May 20, 1980 to Takahashi et al., and U.S. Pat. No. 5,781,276 issued Jul. 14, 1998 to Zahn et al.) use the likelihood probability of P(color/Skin). One drawback of using the conventional likelihood probability is that the probability distribution of non skin-tone pixels is not accounted for. Consequently, there is a higher likelihood for false detection.

The collection of probabilities for all pixels forms a skin-tone probability distribution for the input image. The skin-tone probability distribution is thresholded to create a binary map such that each pixel is designated as either skin-tone or non skin-tone. Alternatively, a face detection algorithm can be used to find human face regions in the input color digital image. Regions of skin-tone colors are then extracted from the detected face regions. For a description of a face detection method, see U.S. Pat. No. 5,710,833 issued Jan. 20, 1998 to Moghaddam et al.

Additionally, methods of creating belief maps for a target subject matter of human flesh are described in the following articles: Cho et al., Adaptive Skin-Color Filter, *Pattern Recognition*, 34 (2001) pp. 1067–1073; and Fleck et al. Finding Naked People, *Proceedings of the European Conference on Computer Vision*, Vol.2, 1996, pp.592–602.

Alternatively, the target subject matter may be human faces, sky, lawn grass, snow, water, or any other subject matter for which an automated method exists for determining subject matter belief from an image. Human face detection is described in many articles. For example, Heisele et al., Face Detection in Still Gray Images, *MIT Artificial Intelligence Lab*, A. I. Memo 1687, C.B.C.L Paper No. 187, May 2000. U.S. Ser. No. 09/450,190 filed Nov. 29, 1999 by Luo et al. describes the creation of belief maps when the target subject matter is blue sky.

The major drawback of conventional techniques for subject matter detection is that they cannot identify primary subject matters reliably because of the lack of consideration of unique characteristics of the subject matters. For example, Saber et al., Automatic Image Annotation Using Adaptive Color Classification, *Graphical Models and Image Processing*, Vol. 58, No. 2, March 1996, pp. 115–126, uses color classification only to detect sky. Consequently and frequently, many types of sky-colored subject matters, such as clothing, man-made object surface, and water, are mistaken as sky. Furthermore, some of these techniques have to rely on the a priori knowledge of the image orientation. Failure to reliably detect the presence of primary subject matters, in particular false positive detection, may lead to failures in the downstream applications (e.g., falsely detected sky regions may lead to incorrect inference of image orientation). Therefore, there is a need for a more robust primary subject detection method.

The need is met by providing a method for detecting subject matter regions in a digital color image having pixels of (red, green, blue) values. This is accomplished by the steps of assigning to each pixel a belief value as belonging to the subject matter region based on color and texture features, forming spatially contiguous candidate subject matter regions by thresholding the belief values, analyzing the spatially contiguous regions based on one or more unique characteristics of the subject matter to determine the probability that a region belongs to the subject matter, and generating a map of detected subject matter regions and associated probability that the regions belong to the subject matter.

Figure 10:
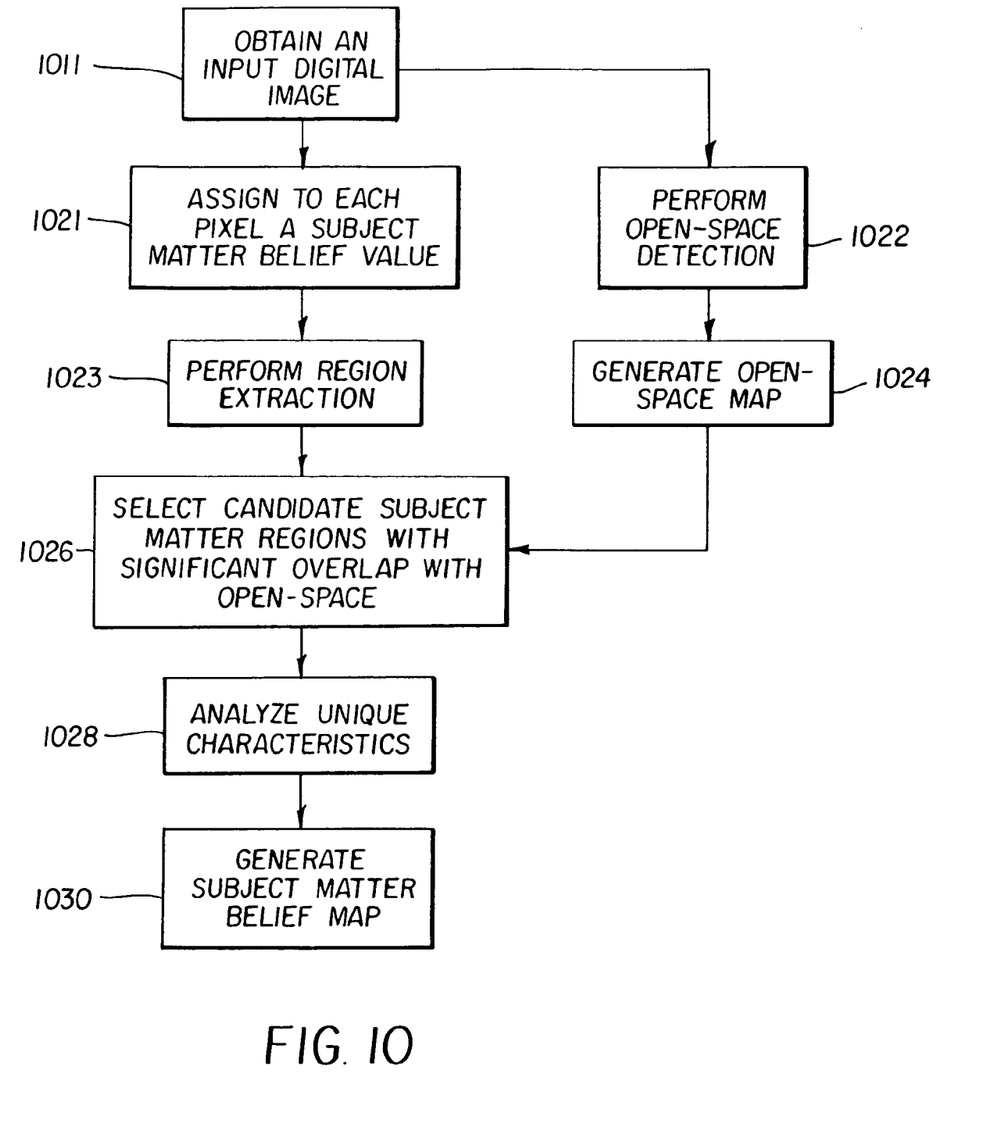
FIG. 10 is a block diagram showing the method for detecting subject matter regions such as sky or grass.

FIG. 10 shows a method according to the present invention for detecting subject matter such as clear blue sky or lawn grass. First, an input color digital image is obtained 1011. Next, each pixel is assigned 1021 a subject matter belief value in a color and texture pixel classification step based on color and texture features by a suitably trained multi-layer neural network. Next, a region extraction step 1023 is used to generate a number of candidate subject matter regions. At the same time, the input image is processed by an open-space detection step 1022 to generate an open-space map 1024 (as described in U.S. Pat. No. 5,901, 245 issued May 4, 1999 to Warnick et al. incorporated herein by reference). Only candidate regions with significant (e.g., greater than 80%) overlap with any region in the open-space map are "smooth" and will be selected 1026 for further processing. These selected candidate regions are analyzed 1028 for unique characteristics. In the case of blue sky, this unique characteristic is a de-saturation effect, i.e., the degree of blueness decreases gradually towards the horizon. This unique characteristic of blue sky is used to differentiate the true blue sky regions from other blue-colored subject matters. In particular, a $2^{nd}$ order polynomial is used to fit a given smooth, sky-colored candidate region in red, green, and blue channels, respectively. The coefficients of the polynomial are classified by a trained neural network to decide whether a candidate region fits the unique characteristic of blue sky. Only those candidate regions that exhibit these unique characteristics are labeled as smooth blue sky regions. In the case of lawn grass, the unique characteristics are a light and isotropic texture, specific location (near bottom of the images and in contact with image borders). Only those candidate regions that exhibit these unique characteristics are labeled as smooth lawn grass regions. A subject matter belief map indicating the location and extent, as well as the associated belief values of detected subject matter regions is generated 1030 as a result of the analysis. Other general subject matter detection (e.g. snow and water) can be performed using a similar approach.

Returning to FIG. 1, multiple subject matter detectors are selected 20, either in parallel or in series, to produce a set of belief maps $M_i(x,y)$ where i ranges from 1 to N. In an alternative case, one of the subject matter detectors may be used to produce a belief map $M_0(x,y)$ that corresponds to the belief that a given pixel does not represent the any of the target subject matters considered by any of the selected subject matter detectors. Such a belief map would contain high (e.g. probabilities near 1.0) values only at pixel positions where all of the belief maps Mi(x,y) contain low (e.g. probabilities near 0.0) values. In essence, the $M_0(x,y)$ belief map indicates the belief that a given pixel location will be considered as background by all the selected subject matter detectors.

Continuing in FIG. 1, an image enhancement operation is selected 40 from a collection of pre-determined image enhancement operations 44. Based on the selected image enhancement operation, an enhancement control signal 50 is generated for controlling the amount of selected enhancement appropriate for the target subject matter and the background subject matters. The selected image enhancement according to the controlling signal is applied 60 to the input digital image 10 to produce an enhanced image 70.

Various types of target subject matter can be detected and various image operations can be performed according to the present invention. For example, the present invention can be used to conservatively sharpen image regions in which human flesh is detected and aggressively sharpen image regions in which human flesh is not detected; conservatively sharpen image regions in which clear sky is detected and aggressively sharpen image regions in which clear sky is not detected. Multiple target subject matters can also be used as a criterion for selective image enhancement. For example, the present invention can be used to conservatively sharpen image regions in which human flesh or clear sky is detected and aggressively sharpen image regions in which human flesh or clear sky is not detected.

Alternatively or additionally, the present invention can be used to conservatively remove noise in image regions in which grass lawn is detected, and aggressively remove noise image in image regions in which grass lawn is not detected; aggressively remove noise image regions in which human flesh is detected, and conservatively remove noise in image regions in which human flesh is not detected; conservatively remove noise in image regions in which bodies of water are detected, and aggressively remove noise image in image regions in which bodies of water are not detected;

Still alternatively or additionally, the present invention can be used to aggressively de-block image regions in which human flesh is detected and conservatively de-block image regions in which human flesh is not detected; aggressively de-block image regions in which clear blue sky is detected and conservatively de-block image regions in which clear blue sky is not detected.

Still alternatively or additionally, the present invention can be used to selectively modify the colors (color re-mapping) of certain target subject matters. For example, the color of sky regions in an image can be modified to a pre-determined "preferred" or "memory" color of the sky; the color of grass regions in an image can be modified to a pre-determined "preferred" or "memory" color of the lawn grass (e.g., that of a golf course); the color of skin regions in an image can be modified in the direction of a pre-determined "preferred" or "memory" color of the skin (e.g., tanned skin). Color re-mapping can include modification of hue, lightness, or saturation of a color. Increasing the saturation of a subject matter is an example of color remapping.

Still alternatively or additionally, the present invention can be used to selectively adjust the scene balance (brightness and color balance) based on the color and brightness of certain target subject matters. For example, the color and brightness of the snow region can be used to determine the overall scene balance or local scene balance if there are multiple light sources; the color and brightness of the skin (face) region can also be used to determine the overall scene balance or local scene balance if there are multiple light sources.

Still alternatively or additionally, the present invention can be used to selectively adjust the tone scale of certain target subject matters. For example, the color gradient of sky regions in an image can be modified to a pre-determined "preferred" or "memory" tone scale (color gradient) of the sky; the contrast and tone scale of face regions in an image can be modified in the direction of a predetermined "preferred" or "memory" tone scale of faces (e.g., that of studio portraits).

Still alternatively or additionally, the present invention can be used to selectively interpolate an image according to a target subject matter. Image interpolation refers to the process of creating a larger, magnified version of an existing image. Typically, bilinear interpolation or cubic spline-based interpolation is used. It is desirable to apply different interpolation techniques in different subject matter areas. In general, planar regions of an image, e.g., blue sky, may be well served by an interpolation algorithm that implements a planar model, such as the well-known bilinear interpolation. Other target subject matters, e.g., grass lawn, foliage, or bodies of rippled water, may not be well served by a planar model and may require a more complicated model, such as a fractal-based model described by U.S. Pat. No. 6,141,017, issued Oct. 31, 2000 to Cubillo et al.

In processing a digital image, it is well known to sharpen the image and enhance fine detail with sharpening algorithms. Typically, this sharpening is performed by a convolution process. For example, see Jain's textbook, Fundamentals of Digital Image Processing, published in 1989 by Prentice-Hall, pp. 249–250. The process of unsharp masking is an example of a convolution based sharpening.

For example, sharpening an image with an unsharp mask can be described with the following equation:

$$s(x,y)=i(x,y)b(m,n)+\beta(x,y)f(i(x,y)-i(x,y)b(m,n)) \quad (1)$$

where
  $s(x,y)$=output image with enhanced sharpness
  $i(x,y)$=original input image
  $b(m,n)$=lowpass convolution filter
  $\beta(x,y)$=control signal factor
  $f(x,y)$=fringe function
  ** denotes two dimensional convolution
  $(x,y)$ denotes the $x^{th}$ row and the $y^{th}$ column of an image
  $(m,n)$ denotes the $m^{th}$ row and the $n^{th}$ column of the convolution filter Typically, an unsharp image is generated by convolution of the image with a lowpass filter (i.e., the unsharp image is given by $i(x,y)b(m,n)$). Next, the highpass signal is generated by subtracting the unsharp image from the original image (the highpass signal is given by $i(x,y)-i(x,y)b(x,y)$). This highpass signal is then modified by a fringe function $f(x,y)$ and control signal function $\beta(x,y)$ which acts as an unsharp mask scale factor. Note that $f( )$ is preferably an identity operation (i.e., does nothing). Finally, the modified highpass signal is added to either the original image or the unsharp image to produce a sharpened image. In a preferred embodiment of the present invention, the control signal is represented by the collection of unsharp mask scale factors $\beta(x,y)$. The value of the control signal $\beta(x,y)$ at any particular location $(x,y)$ is related to the value of various belief maps $\underline{M}(x,y)$ at the corresponding image locations. Assuming that the size (in lines and columns) of the belief map is identical to the size of the image, the preferred relationship between the control signal $\beta(x,y)$ and the belief maps $M(x,y)$ is given by the equation:

$$\beta(x, y) = \frac{\sum_i (M_i(x, y)(T_i - T_0))}{\max\left(\sum_i (M_i(x, y)), 1\right)} + T_0$$

where i represents the index of the subject matter detector. For example, $M_1(x,y)$ may be a belief map representing the belief of human flesh, $M_2(x,y)$ may be a belief map representing belief of blue sky, $M_3(x,y)$ may be a belief map representing the belief of grass, etc.

$T_1$ represents the control signal target for a pixel having high belief in the associated target subject matter. Continuing the above example, $T_1=1.5$ for human flesh, $T_2=1.5$ for blue sky, $T_3=6.0$ for green grass, etc.

$T_0$ represents the control signal target for a pixel that is generally considered to be background ("pure" background) by all the subject matter detectors.

This embodiment does not assume that the subject matter detectors are mutually exclusive. In other words, the value $$\sum_i (M_i(x, y))$$

may be greater than 1.0 for some pixel position (x,y).

In an alternative embodiment, $$\beta(x, y) = \sum_i (M_i(x, y)T_i) + \left(1.0 - \sum_i (M_i(x, y))\right) T_0$$

This example also assumes that the subject matter detectors are mutually exclusive. In other words, the value $$\sum_i (M_i(x, y))$$

is not greater than 1.0 at any pixel position (x,y).

Those skilled in the art of image processing will recognize that many other equations may be used to relate the control signal to the collection of belief maps $M_i(x,y)$. For example, in the further alternative case where the belief map $M_0(x,y)$ indicates the belief that a given pixel does NOT represent the any of the target subject matters considered by any of the selected subject matter detectors, the following relationship may be implemented:

$$\beta(x, y) = \sum_i (M_i(x, y)T_i) + M_0(x, y)T_0$$

Although a similar sharpening effect can be achieved by modification of the image in the frequency domain (for example, the FFT domain) as is well known in the art of digital signal processing, it is in general more difficult to perform spatial varying sharpening in the frequency domain.

In other words, frequency domain techniques are in general not suitable for use with the present invention.

Figure 8:
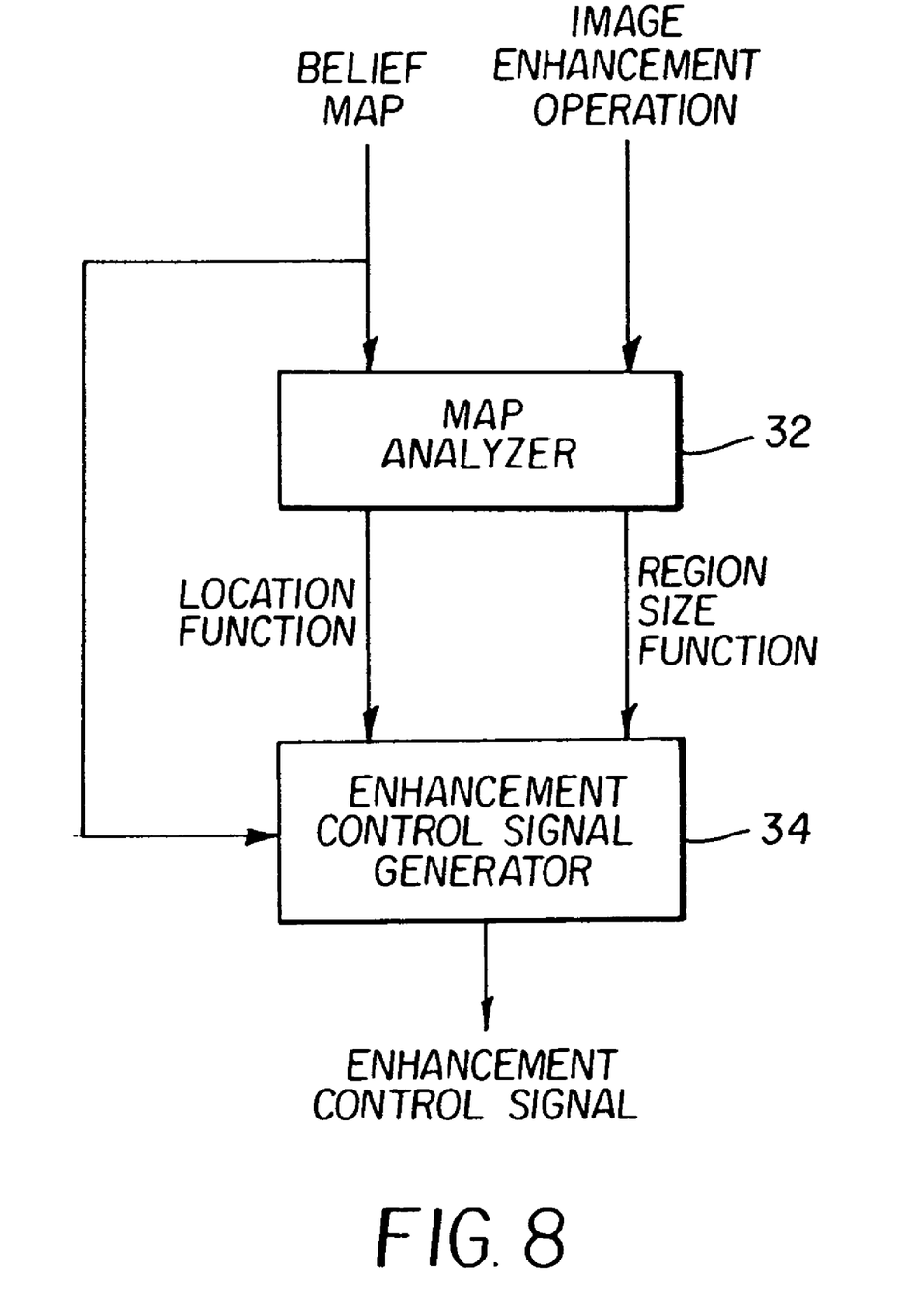
FIG. 8 is a block diagram illustrating the generation of an enhancement control signal according to the present invention.

In the previous example, the value of the control signal at a particular location was shown to be dependent upon only the corresponding values of one or more belief maps $M_i(x,y)$. Alternatively as shown in FIG. 8, the control signal is dependent on other features that can be derived from the belief map from an analysis performed by a belief map analyzer 32. The belief map analyzer 32 inputs the belief map and can output various signals related to the belief map. The signals output by the belief map analyzer may be scalars such as the mean, minimum, maximum, or variance of the belief map. Alternatively or additionally, the signals output from the belief map analyzer can be other maps, preferably having the same dimensions as the belief map(s). For example, the belief map analyzer 32 may produce a location map $L_i(x,y)$ indicating the distance from each pixel location to the center of the image or some other appropriate distance. Additionally, the map analyzer 32 may produce a size map $S_i(x,y)$ in which each pixel's value indicates the size of the region to which it is associated. By using a connected component algorithm such as is well known in the art of image processing, the size of each belief region having non-zero belief may be extracted from the belief map. The size may be determined by counting the number of pixels (or the percentage of total pixels) that belong to each belief region. The signals output from the belief map analyzer are then input to the enhancement control signal generator 34 in addition to the belief map. The enhancement control signal generator 34 then creates an enhancement control signal in which the control value at each location is dependent on the corresponding belief map $M_i(x,y)$ values, the location map $L_i(x,y)$, and the size map $S_i(x,y)$.

The belief map analyzer 32 allows for added flexibility in tuning the selected image enhancement operation for the target subject matter. Consider image sharpening again as an example. In general, image pixels representing human flesh ideally should receive less sharpening. However, the sharpening may be further refined by the realization that small areas of human flesh (e.g., small faces on the image) can tolerate higher levels of sharpening without the appearance of visually unpleasant blemishes or wrinkles than larger areas of human flesh. The size map $S_i(x,y)$ allows the enhancement control signal generator 34 to adapt the control signal based on the belief value and the value within the size map. Consequently, small faces are sharpened less than large faces, both of which are sharpened less than non-face regions.

For example, the following relationship may be implemented by the enhancement control signal generator 34 to generate the control signal:

$$\beta(x, y) = \sum_i k(S_i(x, y)) M_i(x, y) T_i + T_0$$

where k( ) is a function that controls the effect of the region size on the sharpening parameter. The value of k( ) varies monotonically from 0 for small values of $S_i(x,y)$ to 1.0 for large values of $S_i(x,y)$.

Figure 2:
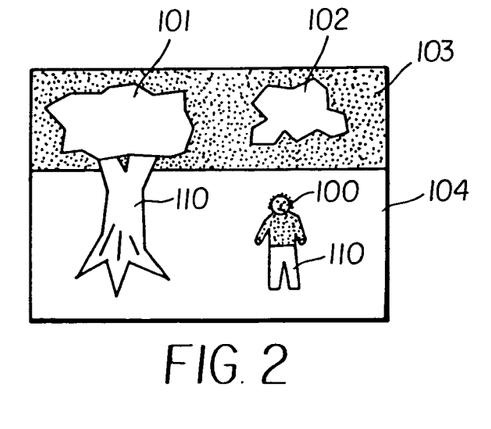
FIG. 2 is an example of a natural image.

Referring to FIG. 2, there is shown a typical snapshot image containing a person (whose face is marked as skin region 100), foliage 101, cloud sky 102, clear blue sky 103, and lawn grass 104. Such an image may also contain snow field (not shown) and a body of water (not shown). FIGS.

Figure 3:
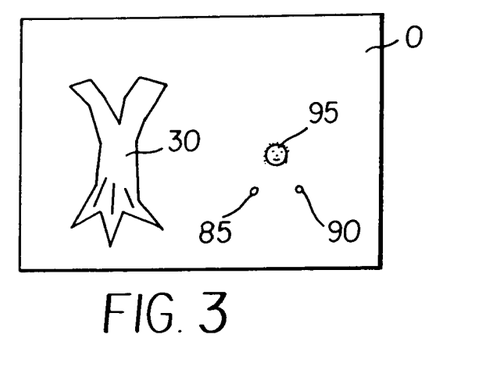
FIG. 3 is an example belief map generated by the subject matter detector 4 when the target subject matter is human flesh with belief values indicated for the different subject matters of the image.
Figure 4:
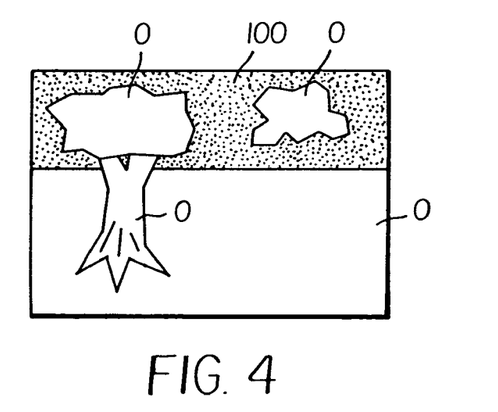
FIG. 4 is an example belief map generated by the subject matter detector 4 when the target subject matter is sky with belief values indicated for the different subject matters of the image.
Figure 5:
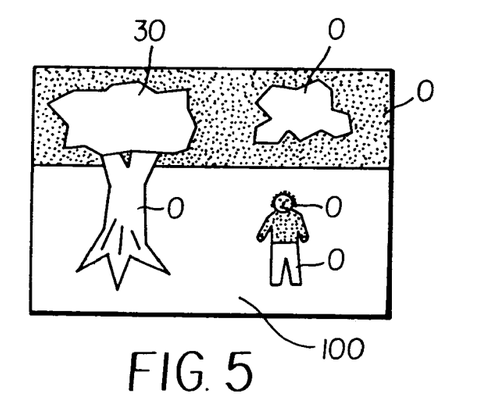
FIG. 5 is an example belief map generated by the subject matter detector 4 when the target subject matter is grass with belief values indicated for the different subject matters of the image.
Figure 6:
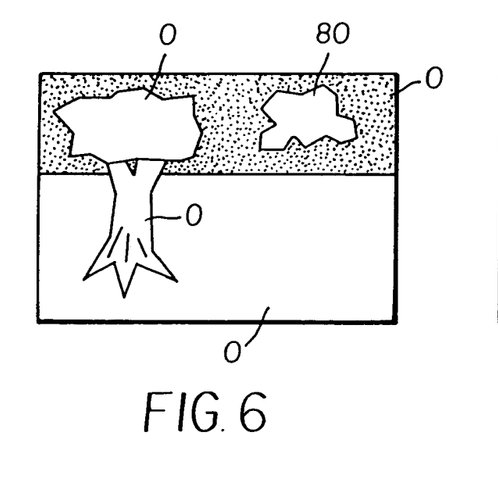
FIG. 6 is an example belief map generated by the subject matter detector 4 when the target subject matter is cloud and snow with belief values indicated for the different subject matters of the image.
Figure 7:
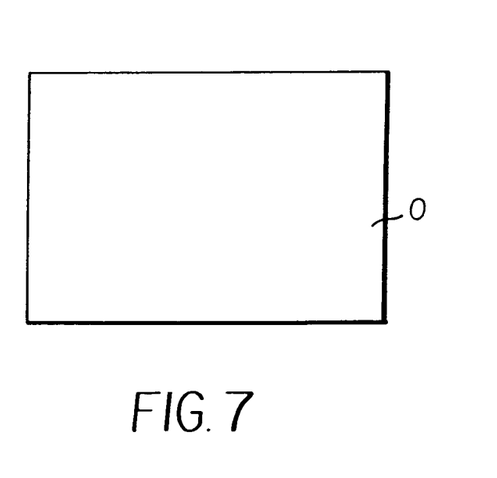
FIG. 7 is an example belief map generated by the subject matter detector 4 when the target subject matter is water with belief values indicated for the different subject matters of the image.

3–8 show the associated belief maps, when the target subject matter is human flesh, sky, lawn grass, snow field, water body, respectively. A null belief map contains only pixels of zero belief values and indicates that the corresponding subject matter is not present in the image (e.g., no water region can be detected in FIG. 7). Note that a given belief map only relates to one type of subject matter. In other words, sky region is indicated as background region in the human skin belief map, and vice versa. The "pure" background regions 110 of the image are made up of the pixels having a belief of zero that the corresponding pixel represents any of the target subject matters. It is also possible that a pixel or a region has non-zero belief values in more than one belief maps, indicating that this pixel may belong to more than one type of subject matters (e.g., region 101 in FIG. 2 may have a probability of 0.3 belonging to grass and a probability of 0.7 belonging to green foliage). FIG. 3 shows an example of a belief map generated by the subject matter detector when the target subject matter is human flesh with belief values indicated for the different subject matters of the image. For example, the face region has a belief value of 95 on a scale of 0 to 100 for human skin, the tree trunk has a belief value of 30 and the background region has a belief value of 0. FIG. 4 shows an example of a belief map generated by the subject matter detector when the target subject matter is sky having a belief value of 100. FIG. 5 shows an example of a belief map generated by the subject matter detector when the target subject matter is grass with the grass having a belief value of 100 and the tree leaves having a belief value of 30. FIG. 6 shows an example of a belief map generated by the subject matter detector when the target subject matter is cloud and snow with the cloud having a belief value of 80. FIG. 7 is shows an example of a belief map generated by the subject matter detector when the target subject matter is water when there is no open water in the scene.

Returning to FIG. 1, alternatively or additionally, the image enhancement operation may be noise reduction, de-blocking, scene balance adjustment, tone scale adjustment, color re-mapping, image interpolation, or any other operations with which one or more attributes of an image can be enhanced.

JPEG de-blocking refers to removing visually objectionable block artificial boundaries as a result of JPEG image compression (see Luo et al. Artifact Reduction in Low Bit Rate DCT-Based Image Compression, *IEEE Transactions on Image Processing*, Vol. 5, No. 9, September 1996, pp. 1363–1368). In general, it is desirable to aggressively remove the blocking artifacts in human faces and smooth gradient of clear blue sky, where the blocking artifacts are most visible and objectionable. However, de-blocking algorithms usually tend to remove image details in such areas as lawn grass, snow fields, and bodies of water, where the blocking artifacts are least visible. Therefore, it is advantageous to apply different amounts of de-blocking to areas of different subject matters. Furthermore, it may be desirable to apply no de-blocking at all to subject matter regions of high texture content because such regions naturally hide blocking artifacts but do not tolerate loss of details.

While in general the information loss due to the quantization in the JPEG compression process may be impractical to recover, some coding artifacts can be alleviated through the incorporation of image smoothness constraints using an appropriate image prior model.

There are several convex potential functions that have been used to enforce image smoothness constraint. Convex functions are often desired because the convergence of a convex constrained problem is always guaranteed if solutions do exist, and it can also be optimized efficiently due to fast convergence. More importantly, with the variable being the difference between neighboring pixels, convex potential functions with smooth transition, i.e., with good continuity properties, result in desired continuity in the image.

A specific Gibbs random field called the Huber-Markov random field (HMRF) is preferred. Its potential function Vc,T(x) is in the form of $$V_{c,T}(x) = \begin{cases} x^2, & |x| \leq T \\ T^2 + 2T(|x| - T), & |x| > T \end{cases}$$

where T is a threshold. If we define the gray level differences between the current pixel $X_{m,n}$ and the pixels within its neighborhood $N_{m,n}$ as:

$$\{x_{m,n} - x_{k,l}\}_{k,l \in N_{m,n}},$$

then, these differences can substitute for the variable of the Huber minimax function. The nice properties of the Huber minimax function is its ability to smooth certain types of artifacts while still preserving the image detail, such as edges and regions of textures. The quadratic segment of the function imposes least mean square smoothing of the artifacts when the local variation is below the threshold T. On the other hand, the linear segment of the function enables the preservation of image details by allowing large discontinuities in the image with a much lighter penalty.

The switching capability of the HMRF model is very important in distinguishing discontinuities of different nature. However, this switching property is still inadequate when we need to distinguish image details from the artifacts. Without semantics, a single value of the threshold T cannot accurately describe all the discontinuities, and is not sufficient to differentiate true image edges from artifacts. With knowledge of detected subject matters, one can select proper threshold T values for different subject matters. For example, a larger value of the threshold T (T1=10) is chosen in the HMRF model for those pixels in the regions corresponding to skin and blue sky to smooth the artifacts, a moderate value of the threshold T (T2=5) is applied to the regions corresponding to lawn grass and rippled water, and a zero value of the threshold T (T=0) is applied to the highly textured regions such as foliage.

De-noising refers to noise reduction in images. See for example a nonlinear filter described by Lee in Digital Image Smoothing and the Sigma Filter, *Computer Vision, Graphics, Image Processing*, Vol. 24, pp. 189–198, April 1983. A nonlinear filter such as the σ-filter has the advantage of better preserving image details when removing noise than linear filters. Local average of neighboring pixel values that are within a difference of σ of the current pixel value is used to replace the current pixel value. Clearly, edges of large magnitude are preserved this way while noise of low magnitude are removed.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The present invention may be implemented for example in a computer program product. A computer program product may include one or more storage media, for example, magnetic storage media such as magnetic disk (such as a floppy disk) or magnetic tape; optical storage media such as optical disk, optical tape, or machine readable bar code, solid-state electronic storage devices such as random access memory (RAM), or read-only memory (ROM); or any other physical device or media employed to store a computer program having instructions for controlling one or more computers to practice the method according to the present invention.

The present invention has been described with reference to a preferred embodiment. Changes may be made to the preferred embodiment without deviating from the scope of the present invention.

PARTS LIST 10 digital color image
20 select subject matter detector
22 subject matter detectors
24 apply subject matter detector step
30 subject matter belief map
32 belief map analyzer
34 enhancement control signal generator
40 select image enhancement operation
44 image enhancement operations
50 generate image enhancement control signal
60 apply image enhancement control signal step
70 enhanced image
100 face/skin region
101 foliage region
102 cloudy sky region
103 clear blue sky region
104 lawn grass region
110 background (non-target) region
951 obtain input digital image step
952 apply scene balance algorithm step
953 produce initial scene balanced digital image step
954 obtain probability values for skin-tone colored pixels step
955 apply predetermined threshold step
956 obtain regions of skin tone colors step
1011 obtain digital image step
1021 color and texture pixel classification step
1022 open-space detection step
1023 region extraction step
1024 generate open-space map step
1026 select overlapping candidate regions step
1028 analyze unique characteristics step
1030 generate belief map step

What is claimed is:

1. A method for processing a digital image, comprising the steps of:
    applying a subject matter detector to the digital image to produce a belief map of values indicating the degree of belief that pixels in the digital image belong to target subject matter, said values defining a plurality of belief regions;
    determining the sizes of each of said belief regions in said belief map;
    enhancing the digital image, said enhancing varying pixel by pixel in accordance with both the degree of belief and the size of the respective said belief region.

2. The method of claim 1 wherein said applying further comprises assigning one of three or more different belief values to each of the pixels of the digital image.

3. The method of claim 2 wherein said assigning is based upon color and texture features.

4. The method claimed in claim 2, further comprising selecting one or more of a plurality of subject matter detectors and using said one or more subject matter detectors to produce said belief values.

5. The method claimed in claim 4, wherein said using further comprises reducing the resolution of the digital image prior to applying the subject matter detector.

6. The method claimed in claim 4, further comprising selecting one or more of a plurality of image enhancement operations, and using said one or more image enhancement operations in said enhancing.

7. A system for processing a digital image, comprising:
    a subject matter detector distinguishing between target and background subject matters in the digital image to produce a belief map of values indicating the degree of belief that pixels in the digital image belong to target subject matter, said values defining a plurality of belief regions; and
    a belief map analyzer determining sizes of said belief regions;
    an image enhancement operator enhancing said digital image, said image enhancement operator controlling the degree of image enhancement pixel by pixel, in accordance with both the degree of belief and the size of the respective said belief region.

8. A method for processing a digital image, comprising the steps of:
    applying a subject matter detector to the digital image to produce a belief map of values indicating the degree of belief that pixels in the digital image belong to target subject matter;
    determining the location and size of each of a plurality of belief regions in said belief map;
    enhancing the digital image, said enhancing varying pixel by pixel in accordance with the degree of belief the size and the location of the respective said belief region.

9. A method for processing a digital image, comprising the steps of:
    providing a subject matter detector for distinguishing between target and background subject matters;
    applying the subject matter detector to the image to produce a belief map of values indicating the degree of belief that pixels in the image belong to target subject matter;
    analyzing the belief map to generate a control signal;
    providing an image enhancement operation that is responsive to the control signal for controlling the degree of image enhancement; and
    applying image enhancement operation to the digital image by varying the control signal pixel by pixel according to the belief map to produce an enhanced image;
    wherein the analyzing includes determining the location and size of each belief region within said belief map and enhancing the control signal based on the locations.

10. The method claimed in claim 9 further comprising selecting one or more of a plurality of subject matter detectors and using said one or more subject matter detectors to produce said belief values.

11. The method claimed in claim 10, wherein said using further comprises reducing the resolution of the digital image prior to applying the subject matter detector.

12. The method claimed in claim 10, further comprising selecting one or more of a plurality of image enhancement operations, and using said one or more image enhancement operations in said enhancing.

13. A method for processing a digital image, comprising the steps of:
  providing a subject matter detector for distinguishing between target and background subject matters;
  applying the subject matter detector to the image to produce a belief map of values indicating the degree of belief that pixels in the image belong to target subject matter, said values defining a plurality of belief regions;
  analyzing the belief map to generate a control signal;
  providing an image enhancement operation that is responsive to the control signal for controlling the degree of image enhancement; and
  applying image enhancement operation to the digital image by varying the control signal pixel by pixel according to the belief map to produce an enhanced image;
  wherein the analyzing includes determining the size of each belief region and enhancing the control signal based on the size.

14. The method claimed in claim 13, wherein a plurality of subject matter detectors are provided, and further comprising the step of selecting one or more of the provided subject matter detectors.

15. The method claimed in claim 14, wherein the target subject matters include human flesh, clear blue sky, lawn grass, snow fields, and water bodies.

16. The method claimed in claim 13, wherein a plurality of image enhancement operations are provided, and further comprising the step of selecting one or more of the provided image enhancement operations.

17. The method claimed in claim 16, wherein the image enhancement operations include sharpening, noise reduction, JPEG de-blocking, tone scale adjustment, scene balance adjustment, and color re-mapping.

18. The method claimed in claim 13, wherein the target subject matter is human flesh.

19. The method claimed in claim 13, wherein the target subject matter is clear blue sky.

20. The method claimed in claim 13, wherein the target subject matter is lawn grass.

21. The method claimed in claim 13, wherein the target subject matter is snow field.

22. The method claimed in claim 13, wherein the target subject matter of is a body of water.

23. The method claimed in claim 13, wherein the image enhancement operation is sharpening.

24. The method claimed in claim 13, wherein the image enhancement operation is noise reduction.

25. The method claimed in claim 13, wherein the image enhancement operation is tone scale adjustment.

26. The method claimed in claim 13, wherein the image enhancement operation is scene balance adjustment.

27. The method claimed in claim 13, wherein the image enhancement operation is color re-mapping.

28. The method claimed in claim 13, wherein the image enhancement operation is JPEG de-blocking.

29. The method claimed in claim 13, wherein the image enhancement operation is image magnification employing interpolation.

30. The method claimed in claim 29, wherein the image interpolation is selectable between bilinear interpolation and fractal based interpolation.

31. The method claimed in claim 13, further comprising the step of reducing the resolution of the digital image prior to applying the subject matter detector.

32. A computer readable program product stored on a computer readable medium for performing the method of claim 13.

33. The method of claim 13, wherein said values indicate more than two different degrees of belief that respective pixels in the image belong to target subject matter.

* * * * *